(12) United States Patent
Klein et al.

(10) Patent No.: US 6,899,355 B2
(45) Date of Patent: May 31, 2005

(54) FITTING FOR FLEXIBLE TUBING

(75) Inventors: Donald J. Klein, Jackson, TN (US); Dennis R. Sweat, Bells, TN (US)

(73) Assignee: Lasco Fittings, Inc., Brownsville, TN (US)

( * ) Notice: Subject to any disclaimer, the term of this patent is extended or adjusted under 35 U.S.C. 154(b) by 25 days.

(21) Appl. No.: 10/118,455

(22) Filed: Apr. 8, 2002

(65) Prior Publication Data

US 2002/0167166 A1 Nov. 14, 2002

Related U.S. Application Data

(60) Provisional application No. 60/282,941, filed on Apr. 10, 2001.

(51) Int. Cl.[7] .................................................. F16L 33/00
(52) U.S. Cl. .................. 285/239; 285/259; 285/148.16; 411/412
(58) Field of Search ................................. 411/413, 414; 285/125.1, 130.1, 131.1, 133.11, 133.4, 133.5, 148.16, 179, 239, 259, 397, 370, 53

(56) References Cited

U.S. PATENT DOCUMENTS

| | | | |
|---|---|---|---|
| 928,237 A | * | 7/1909 | Baird .......................... 285/239 |
| 2,522,684 A | * | 9/1950 | Mitchell et al. ............. 285/253 |
| 3,408,099 A | * | 10/1968 | Appleton ..................... 285/259 |
| 4,603,888 A | * | 8/1986 | Goodall et al. ............... 285/55 |
| 4,875,641 A | * | 10/1989 | Endo et al. .................. 411/413 |
| 4,875,719 A | * | 10/1989 | Mylett ......................... 285/239 |
| 5,251,938 A | * | 10/1993 | Erickson ...................... 385/179 |
| 6,019,559 A | * | 2/2000 | Myers et al. ................ 411/414 |

FOREIGN PATENT DOCUMENTS

DE                3402525      *    5/1985             285/239

* cited by examiner

*Primary Examiner*—Aaron Dunwoody
(74) *Attorney, Agent, or Firm*—Calfree, Halter & Griswold, LLP

(57) ABSTRACT

An improved fitting having an improved flexible tubing tip to connect to flexible tubing, e.g., FUNNY PIPE brand polyethylene pipe, used for sprinkling systems and other fluid delivery systems. According to one aspect of the present invention, one or more annular barbs are positioned at or toward the back of the portion of the fitting inserted into the flexible tubing, with a threaded or spiral or helix portion being positioned at the front of the portion of the fitting inserted into the flexible tubing. According to another aspect of the present invention, the threaded or spiral or helix portion of the fitting is slightly tapered to facilitate insertion into the flexible tubing. According to yet another aspect of the present invention, a double helix spiral thread is used.

19 Claims, 6 Drawing Sheets

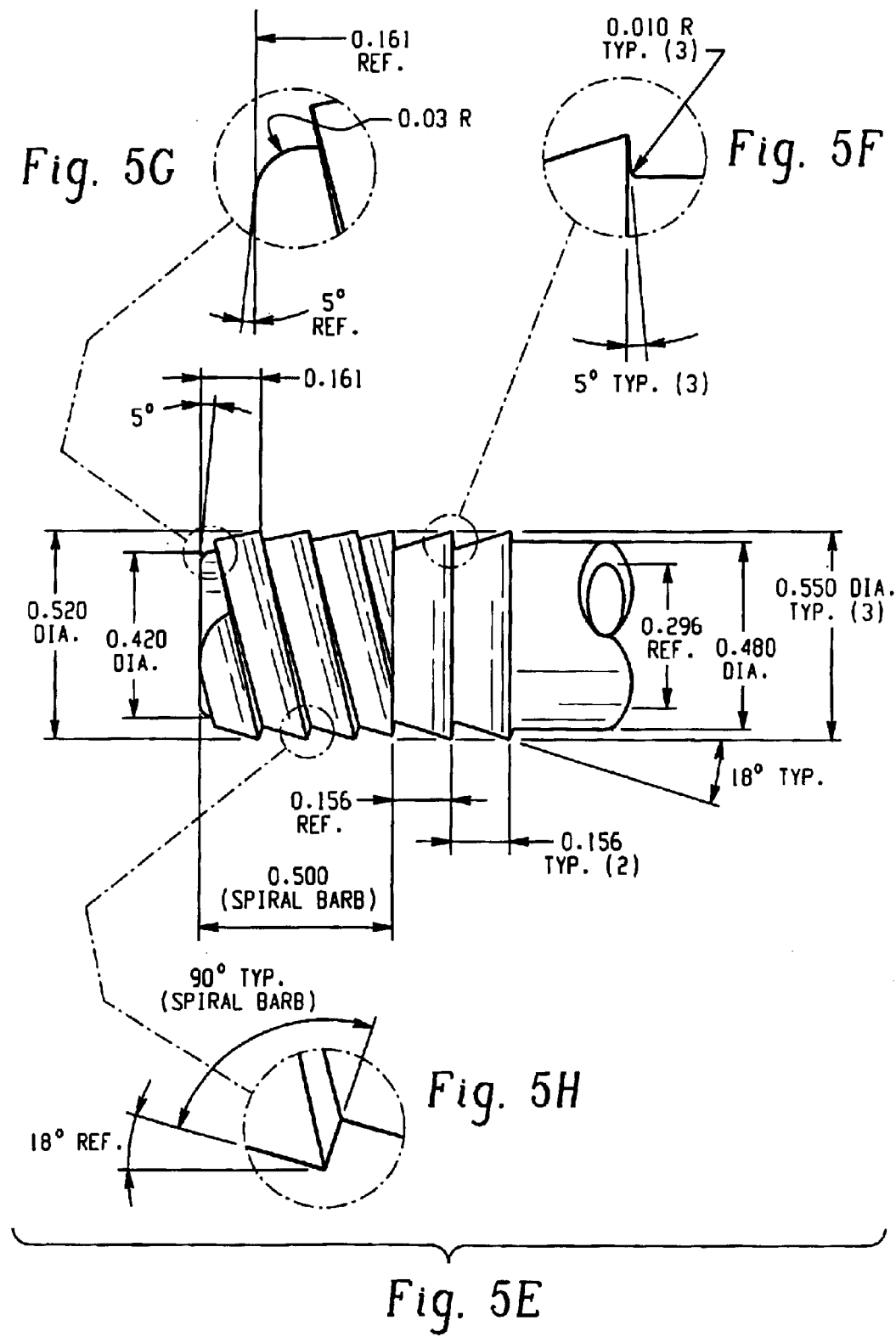

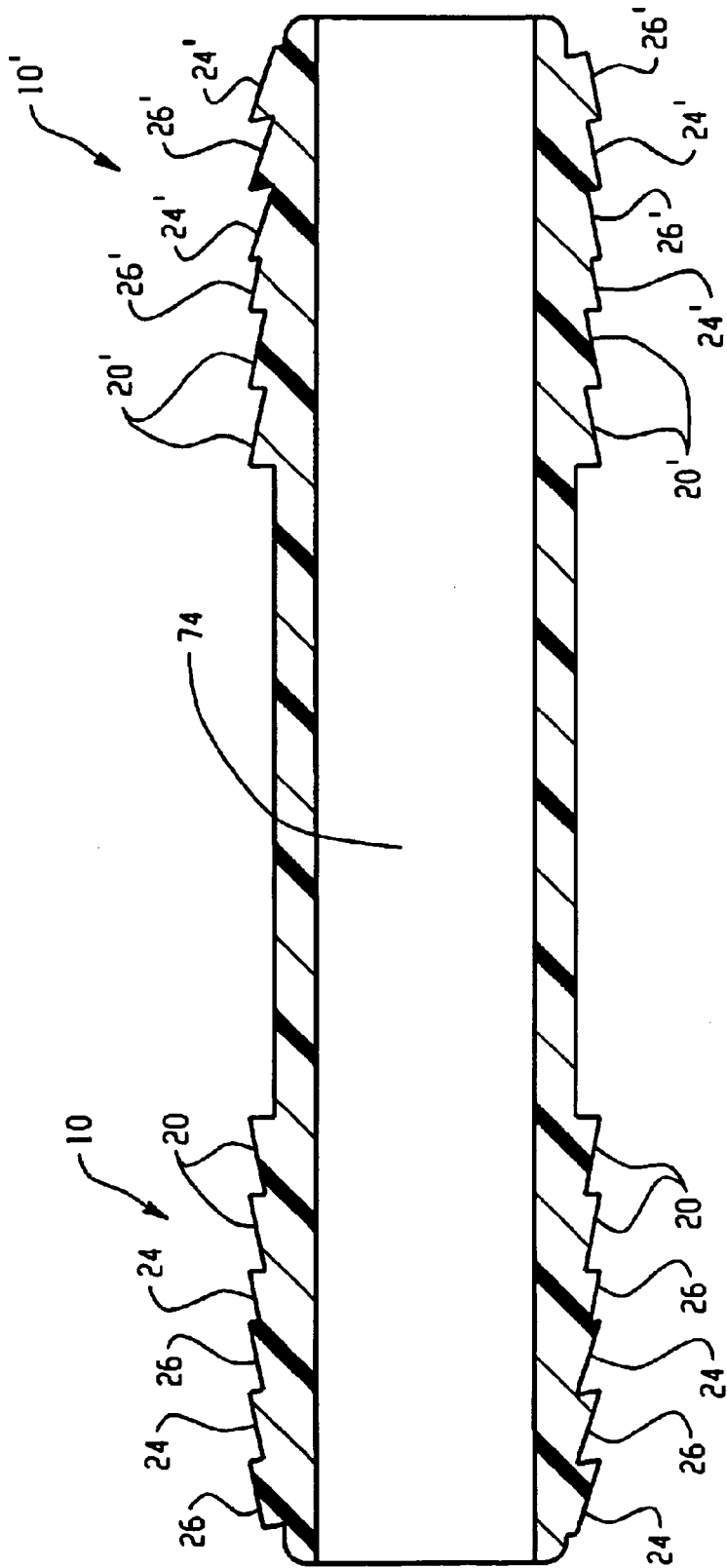

FITTING FOR FLEXIBLE TUBING

This application claims priority to U.S. Provisional Application Ser. No. 60/282,941, filed Apr. 10, 2001, and entitled FITTING FOR FLEXIBLE TUBING.

FIELD OF THE INVENTION

The present invention relates generally to the field of fluid delivery, and more specifically to an improved fitting for connecting to FUNNY PIPE brand flexible tubing and other flexible tubing for irrigation systems.

BACKGROUND OF THE INVENTION

As known in the art of sprinkler systems and other irrigation systems, a tough, relatively flexible polyethylene tubing is often used to connect various components of an irrigation system, for example, to connect a sprinkler head to a rigid water carrying pipe. One type of flexible tubing is sold under the registered trademark FUNNY PIPE. The half-inch FUNNY PIPE tubing has typical dimensions of 0.690" O. D. by 0.490" I. D. Other sizes and brands are available. One common way of attaching pipes and sprinkler heads to FUNNY PIPE flexible tubing is with barbed fittings. Typical barbed fittings include one or more annular barbs at the tip of the fitting that is inserted into the flexible tubing. Typical configurations for such barbed fittings for flexible tubing include a 90° male elbow fitting (0.5" thread at one end of a 90° elbow and a flexible tubing tip at the other end), a 90° female elbow fitting (0.5" female thread at one end of a 90° elbow and a flexible tubing tip at the other end), a 45° male elbow fitting (0.5" thread at one end of a 45° elbow and a flexible tubing tip at the other end), a 45° female elbow fitting (0.5" female thread at one end of a 45° elbow and a flexible tubing tip at the other end), a male adapter fitting (0.5" thread at one end of a straight fitting and a flexible tubing tip at the other end), a female adapter fitting (0.5" female thread at one end of a straight fitting and a flexible tubing tip at the other end), a coupling fitting (flexible tubing tips at both ends), and a T fitting (flexible tubing tips at the three ends of a T-shaped pipe fitting). FIGS. 1A–1E show a prior art 90° male elbow flexible tubing fitting.

The known barbed fittings have a drawback in that they are hard to assemble into flexible tubing, i.e., it requires a great amount of hand strength to insert the barbed fitting into the flexible tubing. For those with the required hand strength, assembling even a few fittings into the flexible tubing can cause severe hand fatigue.

There is a need, therefore, for an improved fitting to connect to flexible tubing.

SUMMARY OF THE INVENTION

The present invention is directed toward an improved fitting having an improved flexible tubing tip to connect to flexible tubing, such as FUNNY PIPE brand tubing. According to one aspect of the present invention, one or more annular barbs (also referred to as straight barbs) are positioned at or toward the back of the portion of the fitting inserted into the flexible tubing, with a threaded or spiral or helix portion being positioned at the tip of the portion of the fitting initially inserted into the flexible tubing. According to another aspect of the present invention, the initial threaded or spiral or helix portion of the fitting is slightly tapered to facilitate insertion into the flexible tubing. According to yet another aspect of the present invention, a double helix spiral thread is used.

These three aspects of the present invention allow for much easier insertion of the fitting into the flexible tubing.

It is contemplated that the improved flexible tubing tip of the present invention, having any one or more of the above-listed aspects, is suitable to be incorporated into virtually all of the typical configurations for barbed fittings, including but not limited to a 90° male elbow fitting (0.5" thread at one end of a 90° elbow and an improved flexible tubing tip at the other end), a 90° female elbow fitting (0.5" female thread at one end of a 90° elbow and an improved flexible tubing tip at the other end), a 45° male elbow fitting (0.5" thread at one end of a 45° elbow and an improved flexible tubing tip at the other end), a 45° female elbow fitting (0.5" female thread at one end of a 45° elbow and an improved flexible tubing tip at the other end), a male adapter fitting (0.5" thread at one end of a straight fitting and an improved flexible tubing tip at the other end), a female adapter fitting (0.5" female thread at one end of a straight fitting and an improved flexible tubing tip at the other end), a coupling fitting (improved flexible tubing tips at both ends), and a T fitting (improved flexible tubing tips at the three ends of a T-shaped pipe fitting).

This and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein:

FIGS. 5A–5H are manufacturing drawings of the improved flexible tubing tip according to the present invention shown in FIG. 2 and the improved male elbow flexible tubing fitting according to the present invention shown in FIG. 3; and FIG. 6 is a cross-sectional view of the plain coupling fitting shown in FIG. 4C, with one end of the coupling using the references of FIG. 2 un-primed and the other end using the references of FIG. 2 primed.

DETAILED DESCRIPTION OF THE INVENTION

Figure 2:
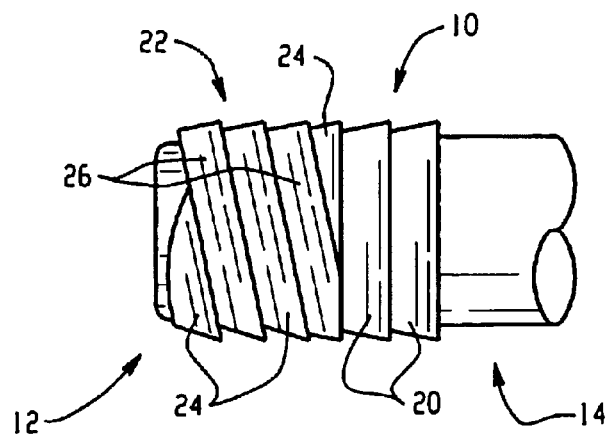
FIG. 2 is a plan view of an improved flexible tubing tip according to the present invention.

The present invention is directed toward an improved fitting having an improved fitting tip to connect to flexible tubing. FIGS. 2–6 show various embodiments and aspects of the present invention. FIG. 2 shows an improved fitting tip 10 for insertion into flexible tubing, such as FUNNY PIPE tubing. The fitting tip 10 has a front portion 12, which is inserted into the flexible tubing, and a back portion 14 opposite the front portion 12.

Figure 3A:
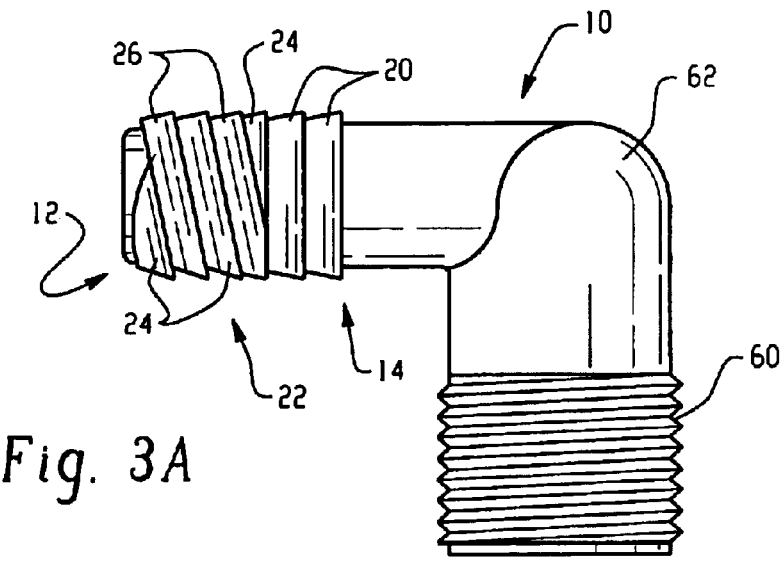
FIG. 3A is a plan view of an improved male elbow flexible tubing fitting having the improved flexible tubing tip according to the present invention (thread at one end of an elbow and an improved flexible tubing tip at the other end)
Figure 3B:
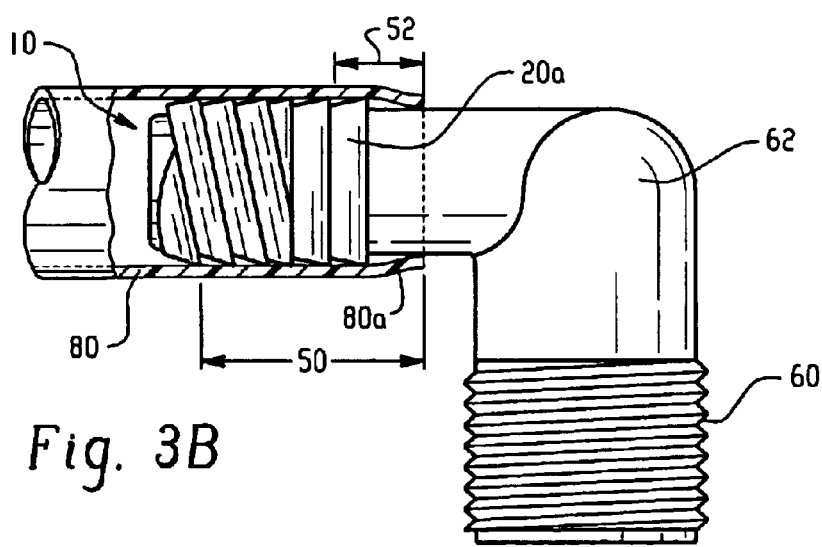
FIG. 3B is a view of the improved male elbow flexible tubing fitting of FIG. 3A inserted into a section of flexible tubing shown partly in cross section.

According to one aspect of the present invention, one or more annular barbs 20 (also referred to as straight barbs 20) are positioned at or toward the back portion 14 of the portion of the fitting inserted into the flexible tubing, with a threaded or spiral or helix portion 22 being positioned at the front end 12 of the portion of the fitting inserted into the flexible tubing. This aspect of the present invention allows for much easier insertion of the fitting tip 10 into the flexible tubing. In the prior art fittings, a straight barb (a) is positioned at the tip that is inserted (see FIGS. 1A–1E). Thus, a user of this prior art fitting had to force that straight barb (a) or barbs and the spiral barb (b) over a relatively long length of the inside of the flexible tubing, i.e., from the tip of the flexible tubing to the final location of the barb, approximated as length 50 in FIG. 3B. With the tip 10 of the present invention, the user must force the barbs over a much shorter length of the inside of the flexible tubing, shown as length 52 in FIG. 3B. FIG. 3B also shows a length of flexible tubing 80 connected to the fixture shown in FIG. 3A. Note that a portion 80a of the tubing 80 has contracted back around the last annular barb 20a (straight barb 20a), because the diameter of the annular barb 20 is greater than the nominal inner diameter of the flexible tubing 80.

According to another aspect of the present invention, the threaded or spiral or helix portion 22 of the fitting is slightly tapered to facilitate insertion into the flexible tubing.

Figure 5A:
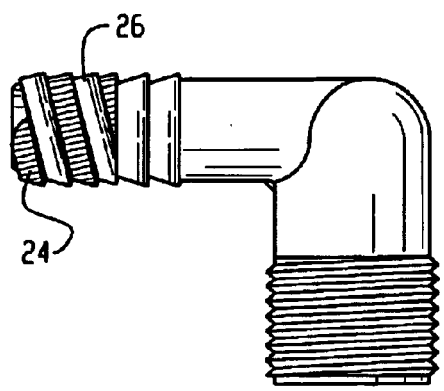

According to yet another aspect of the present invention, a double helix spiral thread is used for the portion 22. In the specific embodiment shown in FIG. 2, two spirals 24, 26 are shown. This last aspect is also shown in FIG. 5A in which the first spiral 24 is shaded and the second spiral 26 is unshaded. In the embodiment shown in FIGS. 5A–5H, the spirals 24, 26 form a barb area that is an 8 pitch, double lead tapered spiral barb (tapering from 0.520" to 0.550" in diameter), in which the shaded spiral 24 is first lead at 4 pitch and the unshaded spiral 26 is second lead at 4 pitch. In contrast, the prior art tip shown in FIGS. 1A–1E is an 8 pitch tapered spiral barb (tapering from 0.530" to 0.550" in diameter).

These three aspects of the present invention allow for much easier insertion of the fitting into the flexible tubing. It is contemplated that any combination or permutation of one or more of these three aspects may be included in a fitting according to the present invention.

Figure 1E:
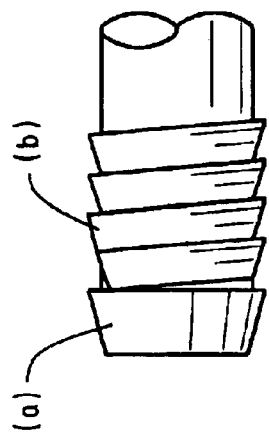
FIGS. 1A–1E are manufacturing drawings of a prior art male elbow flexible tubing fitting (0.5" thread at one end of an elbow and a prior art flexible tubing tip at the other end)
Figure 1A:
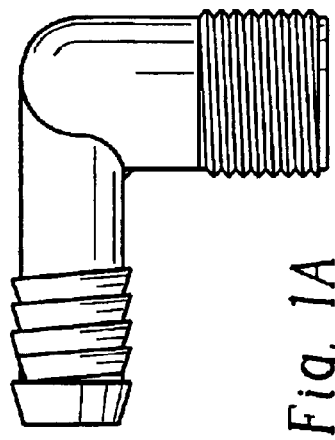
Figure 1D:
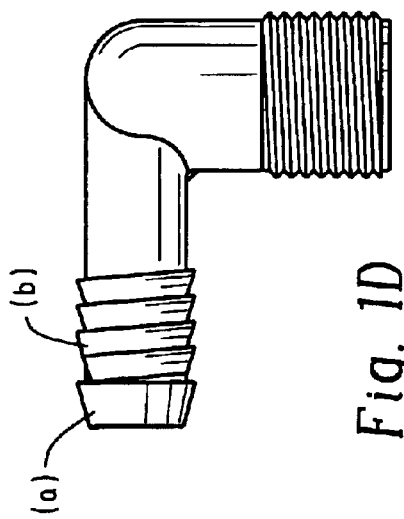
Figure 1C:
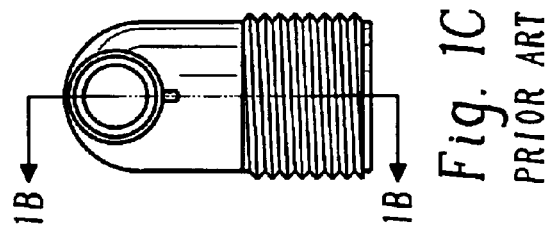
Figure 1B:
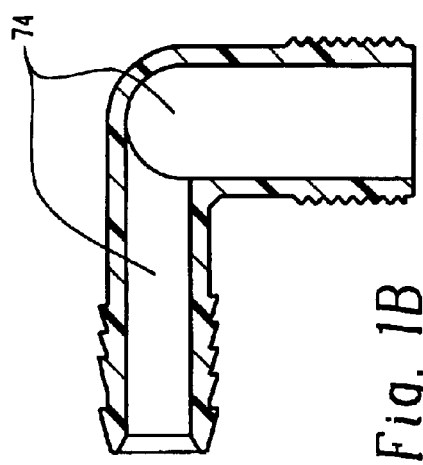
Figure 4A:
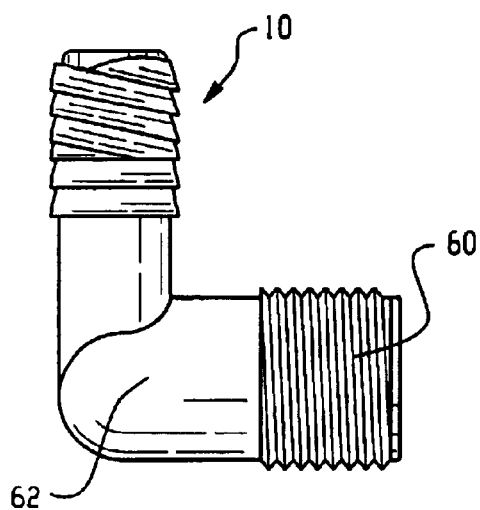
FIGS. 4A–4E are plan views of a male elbow fitting, a male adapter fitting, a plain coupling fitting, a coupling fitting with a grip collar, and a T fitting, respectively, according to the present invention.
Figure 4D:
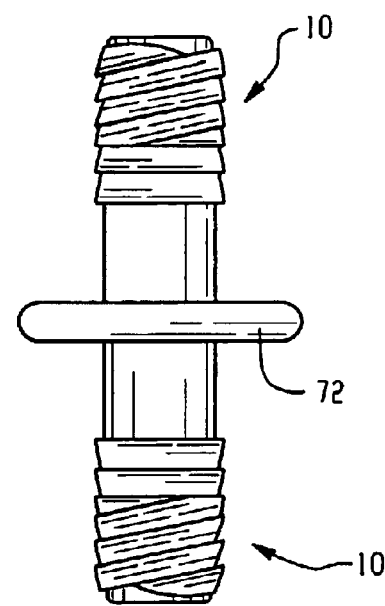
Figure 4B:
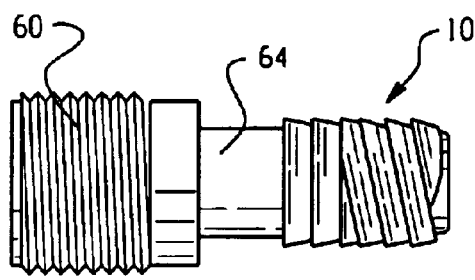
Figure 4C:
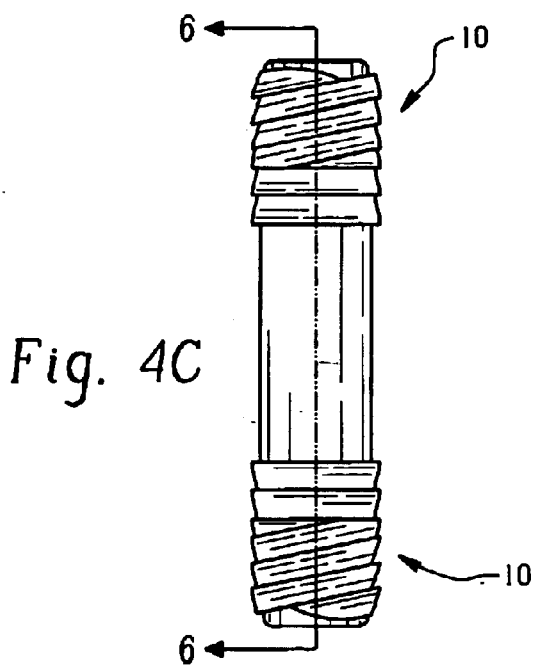
Figure 4E:
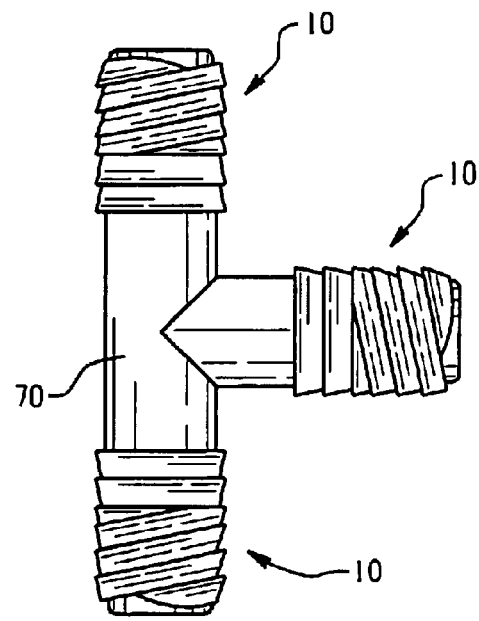
Figure 5B:
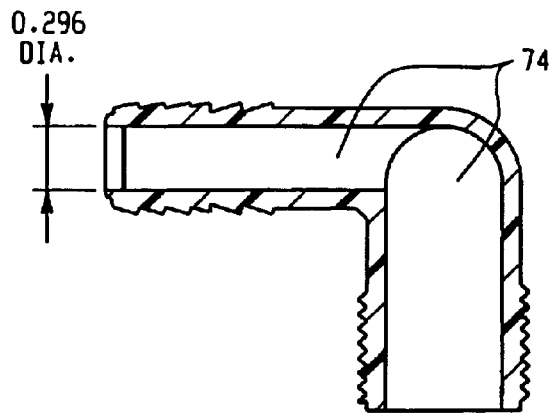
Figure 5C:
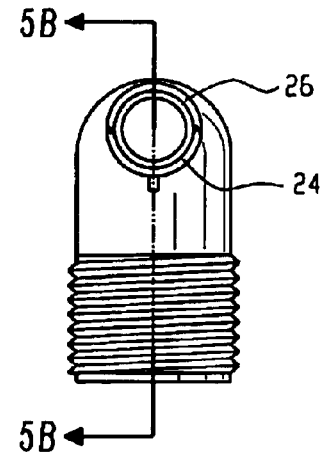
Figure 5D:
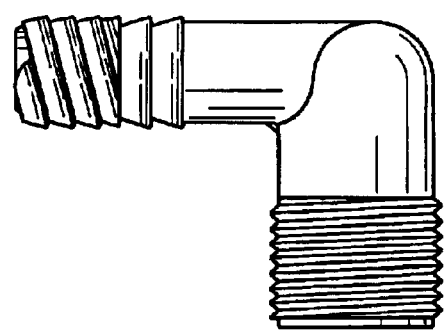

One or more of these improved fitting tips 10 can be incorporated into many different configurations of fittings used to connect various devices to flexible tubing, such as FUNNY PIPE brand tubing, including but not limited to: (a) a 90° male elbow fitting (FIG. 4A) (thread 60 at one end of a 90° elbow 62 and an improved flexible tubing tip 10 at the other end), (b) a 90° female elbow fitting (not shown, but one of ordinary skill in the art can easily make one based on the present disclosure by adapting a prior art 90° female elbow fitting to use the improved tip 10 of the present invention in place of a prior art tip) (female thread at one end of an elbow and an improved flexible tubing tip at the other end), (c) a 45° male elbow fitting (not shown, but one of ordinary skill in the art can easily make one based on the present disclosure by adapting a prior art 45° male elbow fitting to use the improved tip 10 of the present invention in place of a prior art tip) (thread at one end of a 45° elbow and an improved flexible tubing tip at the other end), a 45° female elbow fitting (not shown, but one of ordinary skill in the art can easily make one based on the present disclosure by adapting a prior art 45° female elbow fitting to use the improved tip 10 of the present invention in place of a prior art tip) (female thread at one end of a 45° elbow and an improved flexible tubing tip at the other end), a male adapter fitting (FIG. 4B) (thread 60 at one end of a straight fitting 64 and an improved flexible tubing tip 10 at the other end), a female adapter fitting (not shown, but one of ordinary skill in the art can make one based on the present disclosure by adapting a prior art female adapter fitting to include the improved tip 10 of the present invention in place of a prior art tip) (female thread at one end of a straight fitting and an improved flexible tubing tip at the other end), a coupling fitting (FIGS. 4C and 4D) (improved flexible tubing tips 10 at both ends), and a T fitting (FIG. 4E) (improved flexible tubing tips 10 at the three ends of a T-shaped pipe fitting 70). Additional embodiments (all not shown, but all of which can be easily made by one of ordinary skill in the art based on the present disclosure by adapting a prior art fitting to add an improved tip 10 or include the improved tip 10 of the present invention in place of a prior art tip) include: a female-female T fitting (female thread at two ends of a T-shaped pipe fitting and an improved flexible tubing tip 10 at the third end of the T-shaped pipe fitting) and a general T fitting (a straight flow through two ends of a T-shaped pipe fitting and an improved flexible tubing tip 10 at the third end of the T-shaped pipe fitting). The coupling fitting of FIG. 4D has an additional gripping region, e.g., gripping ring 72. For the threaded fittings, the particular thread size will be selected to match the particular application and can be various sizes, e.g., half-inch, three-quarter-inch, one-inch, etc. Of course, all of these fittings have an internal cavity 74 through which fluid can flow from one end to the other(s). Examples of this cavity 74 are shown in FIGS. 1B, 5B, and 6.

The various components of each fitting according to the present invention are preferably integrally manufactured as a single piece. The fittings according to the present invention can be made of acetal or PVC or polypropylene or other suitable materials (e.g., brass and stainless steel), and can be manufactured by injection molding, or die casting, or forging, or other suitable manufacturing methods known to those in the art as being appropriate for the various selected materials.

Use of the fittings according to the present invention is the same as that of the prior art, with the exception that less force is required to insert the fitting tip 10 into the flexible tubing. The one or more tips 10 of the fitting are inserted into one or more lengths of flexible tubing, preferably using hand strength. The other end(s) are connected to the rest of the fluid delivery system (e.g., sprinkler head, rigid fluid carrying pipe, etc.) using ordinary means. For example, a length of rigid fluid-carrying pipe might have an exposed female threaded end to which a sprinkler head is to be connected. An appropriate male fitting, e.g., the 90° male elbow fitting of FIG. 3, is selected and connected to the pipe by ordinary means. A length of FUNNY PIPE flexible tubing is cut and attached to the improved tip 10 of the fitting. At the sprinkler head end, a fitting, e.g., the male adapter fitting of FIG. 4B, is selected and connected to the sprinkler head by ordinary means. The other end of the length of FUNNY PIPE tubing is connected to the improved tip 10 of that fitting, thereby putting the rigid pipe in fluid communication with the sprinkler head via a first fitting, a length of tubing, and a second fitting.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A fitting having at least one tip for insertion into an opening in flexible tubing, thereby placing said fitting in fluid communication with the flexible tubing, said at least one tip comprising:
   a. a front tip portion initially inserted into the opening in the flexible tubing, said front tip portion including at least one threaded or spiral or helix portion, wherein said at least one threaded or spiral or helix portion of said front tip portion comprises a double helix spiral thread;
   b. a back tip portion, positioned with respect to said front tip portion so that said back tip portion is inserted into the opening in the flexible tubing after said front tip portion is inserted, said back tip portion including at least one annular or straight barb.

2. A fitting having at least one tip for insertion into an opening in flexible tubing according to claim 1, wherein said at least one annular or straight barb of said back tip portion comprises a plurality of annular or straight barbs.

3. A fitting having at least one tip for insertion into an opening in flexible tubing according to claim 2, wherein the outer diameter of said front tip tapers from 0.520 inches to 0.550 inches.

4. A fitting having at least one tip for insertion into an opening in flexible tubing according to claim 1, wherein the outer diameter of said front tip tapers from 0.520 inches to 0.550 inches.

5. A fitting having at least one tip for insertion into an opening in flexible tubing according to claim 1, further comprising a second tip for insertion into an opening in flexible tubing, said second tip comprising:
   a. a second front tip portion initially inserted into the opening in the flexible tubing, said second front tip portion including at least one threaded or spiral or helix portion;
   b. a second back tip portion, positioned with respect to said second front tip portion so that said second back tip portion is inserted into the opening in the flexible tubing after said second front tip portion is inserted, said second back tip portion including at least one annular or straight barb, wherein substantially all of said second front tip portion and substantially all of said second back tip portion are in frictional contact with an inner lining of said flexible tubing when the second front tip portion and second back tip portion are fully inserted into the opening; and
   said fitting further comprising a first back portion adjacent said first back tip portion, a second back portion adjacent said second back tip portion, said first and second back portions being coaxial and adjacent each other.

6. A fitting according to claim 5, further comprising a third tip portion for insertion into an opening in flexible tubing, said third tip portion comprising:
   a. a third front tip portion initially inserted into the opening in the flexible tubing, said third front tip portion including at least one threaded or spiral or helix portion;
   b. a third back tip portion, positioned with respect to said third front tip portion so that said third back tip portion is inserted into the opening in the flexible tubing after said third front tip portion is inserted, said third back tip portion including at least one annular or straight barb, wherein substantially all of said third front tip portion and substantially all of said third back tip portion are in frictional contact with an inner lining of said flexible tubing when the third front tip portion and third back tip portion are fully inserted into the opening; and
   said fitting further comprising a third back portion adjacent said third back tip portion, said third back portion being skewed with respect to said coaxial first and second back portions.

7. A fitting according to claim 6, wherein said third back portion is perpendicular to said coaxial first and second back portions.

8. A fitting having at least one tip for insertion into an opening in flexible tubing, thereby placing said fitting in fluid communication with the flexible tubing, said at least one tip comprising:
   a. a front tip portion initially inserted into the opening in the flexible tubing, said front tip portion including at least one threaded or spiral or helix portion, wherein said at least one threaded or spiral or helix portion of said front tip portion comprises a double helix tapered spiral thread;
   b. a back tip portion, positioned with respect to said front tip portion so that said back tip portion is inserted into the opening in the flexible tubing after said front tip portion is inserted, said back tip portion including at least one annular or straight barb.

9. A fitting having at least one tip for insertion into an opening in flexible tubing according to claim 8, wherein said at least one annular or straight barb of said back tip portion comprises a plurality of annular or straight barbs.

10. A fitting having at least one tip for insertion into an opening in flexible tubing according to claim 9, wherein the outer diameter of said front tip tapers from 0.520 inches to 0.550 inches.

11. A fitting having at least one tip for insertion into an opening in flexible tubing according to claim 8, wherein the outer diameter of said front tip tapers from 0.520 inches to 0.550 inches.

12. A fitting having at least one tip for insertion into an opening in flexible tubing, thereby placing said fitting in fluid communication with the flexible tubing, said at least one tip comprising:
   a. a front tip portion initially inserted into the opening in the flexible tubing, said front tip portion including at least one threaded or spiral or helix portion, wherein said at least one threaded or spiral or helix portion of said front tip portion comprises a double lead tapered spiral barb;
   b. a back tip portion, positioned with respect to said front tip portion so that said back tip portion is inserted into the opening in the flexible tubing after said front tip portion is inserted, said back tip portion including at least one annular or straight barb.

13. A fitting having at least one tip for insertion into an opening in flexible tubing according to claim 12, wherein said at least one annular or straight barb of said back tip portion comprises a plurality of annular or straight barbs.

14. A fitting having at least one tip for insertion into an opening in flexible tubing according to claim 13, wherein the outer diameter of said front tip tapers from 0.520 inches to 0.550 inches.

15. A fitting having at least one tip for insertion into an opening in flexible tubing according to claim 12, wherein the outer diameter of said front tip tapers from 0.520 inches to 0.550 inches.

16. A fitting having at least one tip for insertion into an opening in flexible tubing, thereby placing said fitting in fluid communication with the flexible tubing, said at least one tip comprising:
 a. a front tip portion initially inserted into the opening in the flexible tubing, said front tip portion including at least one threaded or spiral or helix portion, wherein said at least one threaded or spiral or helix portion of said front tip portion comprises a multiple lead tapered spiral barb;
 b. a back tip portion, positioned with respect to said front tip portion so that said back tip portion is inserted into the opening in the flexible tubing after said front tip portion is inserted, said back tip portion including at least one annular or straight barb.

17. A fitting having at least one tip for insertion into an opening in flexible tubing according to claim 16, wherein said at least one annular or straight barb of said back tip portion comprises a plurality of annular or straight barbs.

18. A fitting having at least one tip for insertion into an opening in flexible tubing according to claim 17, wherein the outer diameter of said front tip tapers from 0.520 inches to 0.550 inches.

19. A fitting having at least one tip for insertion into an opening in flexible tubing according to claim 16, wherein the outer diameter of said front tip tapers from 0.520 inches to 0.550 inches.

* * * * *